United States Patent
Robb et al.

(10) Patent No.: US 10,429,228 B2
(45) Date of Patent: Oct. 1, 2019

(54) FUEL LEVEL MEASUREMENT USING IN-TANK MEASURING SYSTEM

(71) Applicant: The Boeing Company, Chicago, IL (US)

(72) Inventors: Andrew M. Robb, Ravensdale, WA (US); Jason Bommer, Tacoma, WA (US)

(73) Assignee: The Boeing Company, Chicago, IL (US)

(*) Notice: Subject to any disclaimer, the term of this patent is extended or adjusted under 35 U.S.C. 154(b) by 685 days.

(21) Appl. No.: 13/892,761

(22) Filed: May 13, 2013

(65) Prior Publication Data

US 2014/0331763 A1    Nov. 13, 2014

(51) Int. Cl.
G01F 23/26    (2006.01)

(52) U.S. Cl.
CPC ............ *G01F 23/266* (2013.01); *G01F 23/26* (2013.01)

(58) Field of Classification Search
CPC ...... G01F 23/266; G01F 23/26; G01F 23/263; G01F 23/268
USPC .......................................... 73/304 C, 290 R
See application file for complete search history.

(56) References Cited

U.S. PATENT DOCUMENTS

| | | | |
|---|---|---|---|
| 2,354,964 A | 8/1944 | Ostermann et al. | |
| 2,621,517 A | 12/1952 | Sontheimer | |
| 2,997,577 A * | 8/1961 | Kaminski | H03D 1/2245 327/141 |
| 3,027,751 A * | 4/1962 | Jones | G01N 33/22 324/71.2 |
| 3,140,608 A | 7/1964 | Clark | |
| 4,080,563 A | 3/1978 | Marsh et al. | |
| 4,142,415 A | 3/1979 | Jung et al. | |
| 4,199,984 A | 4/1980 | Huddart et al. | |
| 4,258,422 A | 3/1981 | Dougherty et al. | |
| 4,289,028 A | 9/1981 | Wallman | |

(Continued)

FOREIGN PATENT DOCUMENTS

| | | | |
|---|---|---|---|
| JP | 03248546 | * | 11/1991 |
| JP | 403248546 A | * | 11/1991 |

OTHER PUBLICATIONS

Keith Gibbs, Resistance, 2010, schoolphysics, pp. 1-2.*

(Continued)

*Primary Examiner* — John Fitzgerald
*Assistant Examiner* — Truong D Phan
(74) *Attorney, Agent, or Firm* — Kunzler Bean & Adamson

(57) ABSTRACT

An apparatus for measuring the level of fuel in a fuel tank is disclosed. The apparatus comprises an in-tank measuring system that provides an oscillating output signal generated, for example, by an oscillator such as a multivibrator, where the oscillating output signal has a frequency corresponding to the fuel level. The in-tank measuring system includes a capacitive fuel probe mounted within the fuel tank to contact the fuel. The fuel probe has a capacitance that is a function of the level of the fuel. The oscillator is configured for mounting within the fuel tank at a position in close proximity to the capacitive fuel probe. The oscillator circuit uses the capacitance of the fuel probe to generate the oscillating output signal. A communication path communicates the oscillating output signal from the clock circuit to a circuit exterior to the fuel tank.

20 Claims, 10 Drawing Sheets

(56) References Cited

U.S. PATENT DOCUMENTS

| | | | | |
|---|---|---|---|---|
| 4,377,961 A * | 3/1983 | Bode | G01R 23/165 | 324/76.31 |
| 4,470,300 A * | 9/1984 | Kobayashi | G01F 23/266 | 324/677 |
| 4,487,066 A * | 12/1984 | Pardi | G01F 23/263 | 702/52 |
| 4,515,015 A * | 5/1985 | Kuhlman | G01F 23/263 | 324/678 |
| 4,545,020 A | 10/1985 | Brasfield | | |
| 4,591,946 A * | 5/1986 | Pope | G01F 23/263 | 361/284 |
| 4,656,353 A * | 4/1987 | Thompson | G01F 1/329 | 250/227.14 |
| 5,101,190 A * | 3/1992 | Bullock | G01R 29/0878 | 338/214 |
| 5,421,202 A * | 6/1995 | Le Pimpec | G01F 23/247 | 338/28 |
| 5,513,527 A * | 5/1996 | Griffiths | G01F 23/0069 | 340/945 |
| 5,602,333 A | 2/1997 | Larrabee et al. | | |
| 5,723,870 A * | 3/1998 | Crowne | B64D 37/00 | 250/221 |
| 6,356,809 B1 | 3/2002 | Morrison et al. | | |
| 7,293,470 B2 * | 11/2007 | Mansfield | H02H 9/008 | 702/45 |
| 7,629,800 B2 * | 12/2009 | Parachini | G01F 23/243 | 324/691 |
| 9,299,471 B1 * | 3/2016 | Robb | H01B 1/00 | |
| 2003/0048616 A1 * | 3/2003 | Ko | G11C 5/04 | 361/736 |
| 2005/0173642 A1 * | 8/2005 | Petrick | H01L 27/14658 | 250/370.09 |
| 2006/0058588 A1 * | 3/2006 | Zdeblick | A61B 5/0422 | 600/300 |
| 2007/0063751 A1 * | 3/2007 | Kanda | H03K 5/02 | 327/175 |
| 2008/0276704 A1 * | 11/2008 | Naydenov | G01F 23/266 | 73/304 C |
| 2009/0085217 A1 * | 4/2009 | Knickerbocker | H01L 21/486 | 257/774 |
| 2010/0045473 A1 * | 2/2010 | Frizzell | G08B 13/1445 | 340/649 |
| 2010/0109859 A1 * | 5/2010 | Lakosky | B60Q 1/46 | 340/471 |
| 2010/0154534 A1 | 6/2010 | Hampton | | |
| 2010/0251816 A1 | 10/2010 | Bahorich et al. | | |
| 2010/0305499 A1 * | 12/2010 | Matsiev | A61B 5/145 | 604/67 |
| 2011/0071777 A1 * | 3/2011 | Duan | G01D 3/02 | 702/55 |
| 2011/0169549 A1 * | 7/2011 | Wu | H02M 7/003 | 327/434 |
| 2012/0007653 A1 * | 1/2012 | Choo | H03K 5/15093 | 327/400 |
| 2012/0188214 A1 * | 7/2012 | Hosokawa | G09G 3/20 | 345/208 |
| 2012/0256750 A1 * | 10/2012 | Novak | A61F 13/42 | 340/573.5 |
| 2016/0051176 A1 * | 2/2016 | Ramos | A61B 5/208 | 600/573 |

OTHER PUBLICATIONS

Marian, Simple square wave generator, May 2011, electroschematic, pp. 1-4.*

Multivibrators, Oct. 2012, Electronics-Tutorials.ws, Electronics Tutorial about Multivibrators and Oscillators (Year: 2012).*

Extended European Search Report, Patent Application No. 14168193.2 dated Nov. 5, 2014.

* cited by examiner

Figure 6

| Fuel Height | Frequency |
|---|---|
| 0" | 1380 |
| 1" | 1280 |
| 2" | 1205 |
| 3" | 1138 |
| 4" | 1078 |
| 5" | 1022 |
| 6" | 972 |
| 7" | 923 |
| 8" | 855 |
| 9" | 807 |

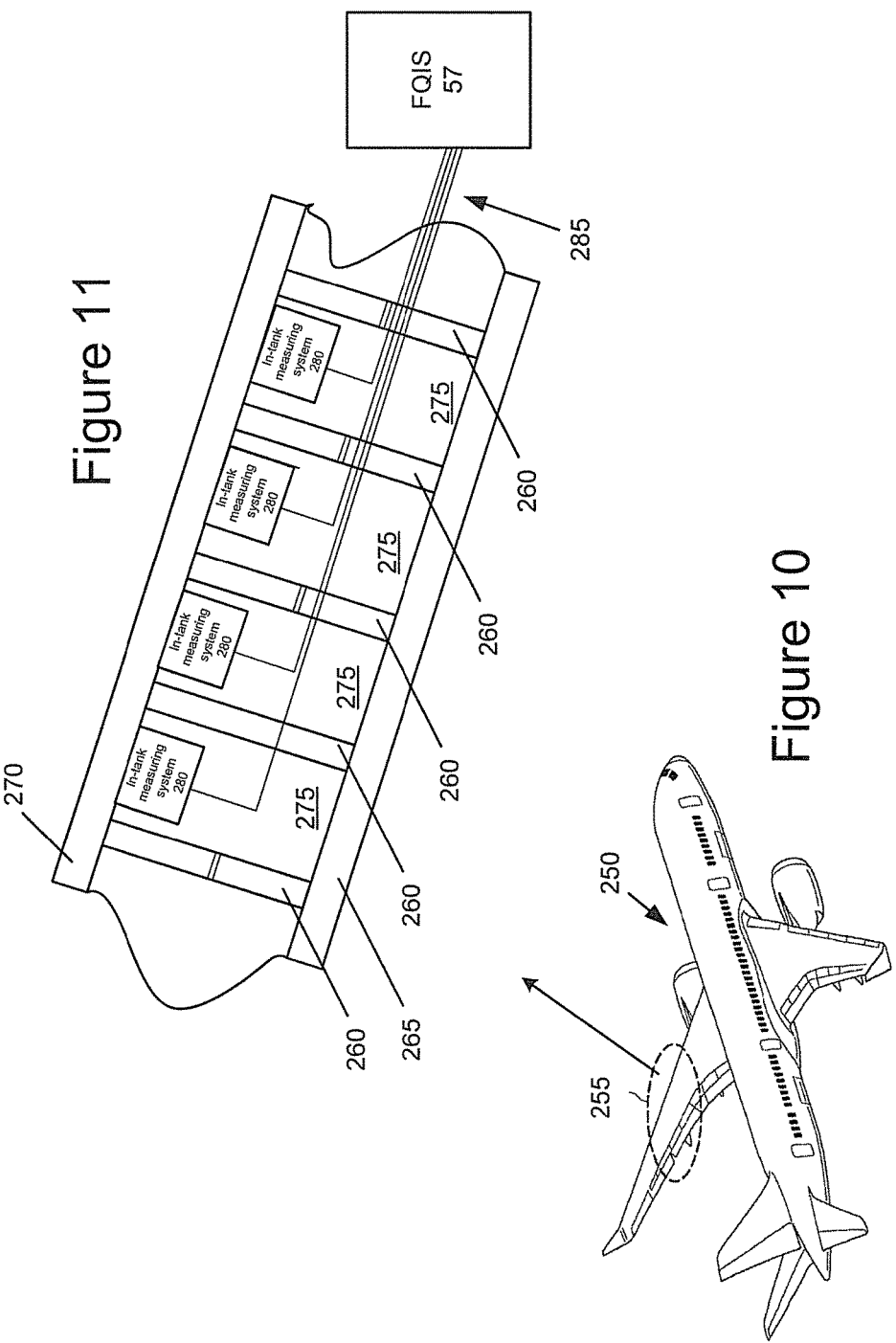

FUEL LEVEL MEASUREMENT USING IN-TANK MEASURING SYSTEM

BACKGROUND

One apparatus used to measure the level of the fuel in a fuel tank, such as an aircraft fuel tank, includes a capacitive fuel probe. The capacitance of the fuel probe varies with the level of the fuel. In such designs, the capacitance of the fuel probe may be at a maximum value when the fuel tank is full, and at a minimum value when the fuel tank is empty.

Metal wires, such as wires formed from copper, are attached to the variable capacitor of the fuel probe and extend through the fuel tank, often along a substantial run (e.g., between about 15 feet and about 40 feet), to a location exterior to the tank. The low resistance wires terminate at a measurement circuit that uses the capacitance of the fuel probe, as measured at the termination of the wires, to provide an output signal that is a function of the capacitance of the fuel probe. The output signal of the measurement circuit may be part of or provided to, for example, a Fuel Quantity Indicating System of an aircraft, which generates fuel level data that may be displayed to a pilot, maintenance mechanic, or the like.

The accuracy of the measurement circuit depends on the transmission characteristics of the metal wires. In this regard, the capacitance of the fuel probe as measured at the termination of the run of metal wires is distorted by the resistance and capacitance of the wires. The total attenuation and inter-wire capacitance of the run increases with the distance between the fuel probe and the measuring circuit. However, long wire runs are increasingly specified in the design of large aircraft, where the total attenuation and inter-wire capacitance may limit accurate measurement of the fuel probe capacitance and, thus, the fuel level.

SUMMARY

An apparatus for measuring the level of fuel in a fuel tank, such as an aircraft fuel tank, is disclosed. The apparatus comprises an in-tank measuring system that provides an oscillating output signal having a frequency corresponding to the fuel level. The in-tank measuring system may include a capacitive fuel probe configured for mounting within the fuel tank at a position to contact the fuel. The capacitive fuel probe has a capacitance that is a function of the level of the fuel in the fuel tank. The in-tank measuring system further comprises an oscillator circuit, such as an astable multivibrator clock circuit, that is configured for mounting within the fuel tank at a position in close proximity to the capacitive fuel probe. The oscillator circuit generates the oscillating output signal, which has a frequency corresponding to the capacitance of the capacitive fuel probe. A communication path is configured to communicate the oscillating output signal, or a signal corresponding to the oscillating output signal, between the oscillator circuit and a circuit exterior to the fuel tank. In one example, the communication path includes high resistance wire. In another example, the communication path includes an optical path. In a still further example, the communication path is a wireless RF path.

The features, functions, and advantages that have been discussed can be achieved independently in various embodiments or may be combined in yet other embodiments further details of which can be seen with reference to the following description and drawings

BRIEF DESCRIPTION OF THE DRAWINGS

FIG. 6 is a chart of an exemplary correspondence between the fuel level and the frequency of the clock output signal using the clock generator design of FIG. 5.

FIG. 10 shows an aircraft having wing fuel tanks.

FIG. 11 is a cutaway view of the wing of the aircraft in FIG. 10 in which the wing fuel tanks are exposed.

DETAILED DESCRIPTION

Figure 1:
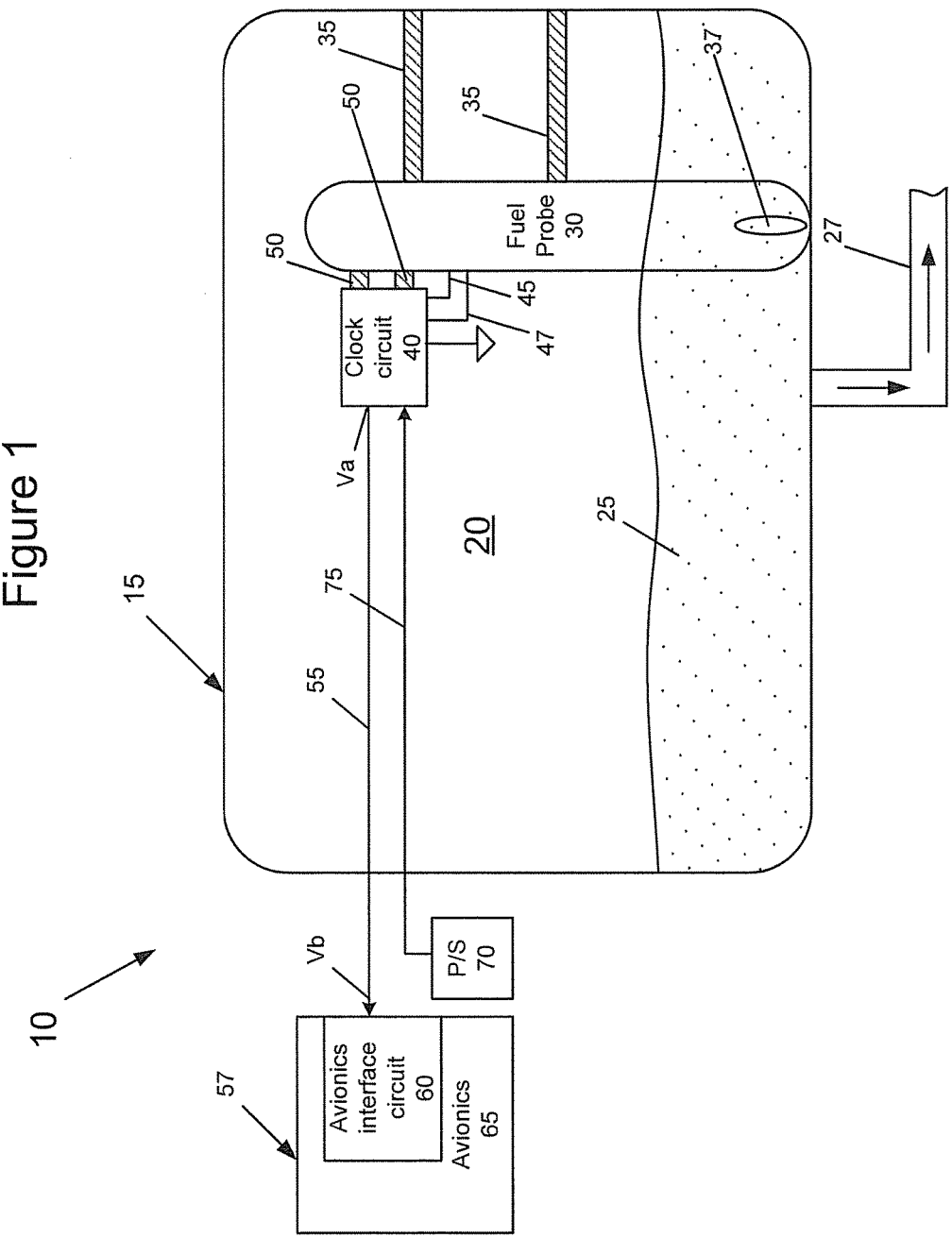
FIG. 1 shows a system, such as an aircraft system, in which a level of fuel in a fuel tank is measured by an in-tank measuring system having a clock output signal corresponding to the fuel level.

FIG. 1 shows a system 10, such as an aircraft system, in which the level of fuel in a fuel tank is measured. The system includes a fuel tank 15 having an interior space 20 configured to hold an amount of fuel 25. The fuel tank 15 may be the fuel tank of an aircraft, where the fuel 25 is provided to one or more engines through a fuel line 27.

An in-tank fuel measurement system is located at a predetermined position within the interior space 20 of the fuel tank 15. The in-tank fuel measurement system provides a clock output signal to an electrical circuit exterior to the fuel tank 15. In this example, the in-tank fuel measurement system includes a capacitive fuel probe 30 mounted within the interior space 20 for contacting the fuel 25. Here, the fuel probe 30 is mounted to the inner sidewalls of the fuel tank 15 by, for example, support members 35. The support members 35 may be formed in any manner to retain the fuel probe 30 at a specified position within the fuel tank 15.

The fuel probe 30 includes a port 37 to maintain the fuel level within the fuel probe 30 at a level corresponding to the level of the fuel 25 exterior to the fuel probe 30. For example, the level of the fuel within the fuel probe 30 may be the same as the level of the fuel 25 within the interior space 20. The fuel within the fuel probe 30 operates as a dielectric of a capacitor formed within the fuel probe 30. The electrical capacitance of the fuel probe 30 varies with the level of the fuel forming the dielectric and, as a result, with the level of fuel 25 within the fuel tank 15. This relationship provides a means for measuring the fuel level using the capacitance of the fuel probe 30.

Electrical conductor 45 and electrical conductor 47 place the variable capacitor of fuel probe 30 in electrical communication with an oscillator circuit, shown here as clock circuit 40. Clock circuit 40 may, for example, be in the form of an astable multivibrator.

The electrical conductors 45 and 47 may be formed from metallic wire having resistances low enough to prevent excessive damping of the output of the clock circuit 40. The resistive and capacitive characteristics of the electrical conductors 45 and 47, however, may make it difficult to measure the capacitance of the fuel probe 30 over long runs. Shorter runs reduce the resistance and capacitance of the electrical conductors 45 and 47 compared to longer runs, thereby increasing the ability of the clock circuit 40 to accurately measure the fuel probe capacitance. Such shorter runs, as shown in FIG. 1, may be obtained when the clock circuit 40 and the fuel probe 30 are each located within the interior space 20. In this example, the clock circuit 40 is configured for mounting at a position in close proximity to the fuel probe 30. This configuration may reduce the length of the run of electrical conductors 45 and 47.

In FIG. 1, the clock circuit 40 is rigidly fixed to an exterior surface of the fuel probe 30 by mounting members 50. Additionally, or in the alternative, the clock circuit 40 may be mounted to an interior surface of fuel tank 15 in close proximity to the fuel probe 30. Still further, the clock circuit 40 may be mounted on one or more of the support members 35, or extensions thereof. Other configurations for mounting the clock circuit 40 in close proximity to the fuel probe 30 are also suitable to minimize the run of electrical conductors 45 and 47 between the fuel probe 30 and the clock circuit 40.

The clock circuit 40 is configured to generate a clock output signal having a frequency corresponding to the capacitance of the fuel probe 30. In the illustrated example, the clock output signal is transmitted along communication path, such as transmission line 55, from the clock circuit 40 to an electrical circuit disposed exterior to the fuel tank 15. Here, the electrical circuit may be provided as an interface between the electrical circuit and, for example, a Fuel Quantity Indicating System 57 of an aircraft. Such a Fuel Quantity Indicating System 57 may include several independent measurement and indication components such as fuel tank and engine feed tank contents and low level alerting. The Fuel Quantity Indicating System 57 in FIG. 1 includes an avionics interface circuit 60, which converts the clock output signal on transmission line 55 to a corresponding signal used by the avionics 65 of the aircraft. Transmission line 55 therefore operates to provide the communication path for the clock output signal.

Power is provided to the clock circuit 40 using an electrical circuit exterior to the fuel tank 15. In FIG. 1, power is provided from a power supply 70, which may be a dedicated power supply or one common to multiple fuel probes 30 and multiple clock circuits 40 in multiple fuel tanks and/or fuel tank sections. Here, power is provided to the clock circuit 40 over power line 75.

Various types of transmission/power lines may be used in system 10. For example, one or both of lines 55 and 75 may use high resistance wire. Wire resistances greater than about 1KΩ/m may be used. Such high resistance wiring can provide useful signal communication over distance up to, for example, 100 meters, which is suitable for aircraft fuel tanks. Wiring used in FQIS systems is composed of metallic copper alloys with a resistance per unit length of between 1 MΩ and 800 MΩ depending upon composition and size. Lines 55 and 75 may also be composed of much higher resistance wiring. In the case of non-metal conductors, such as carbon and conductive polymers, the wire resistance may be thousands of times greater than copper with a resistance per unit length of 1KΩ/m up to 1 MΩ/m.

Figure 2:
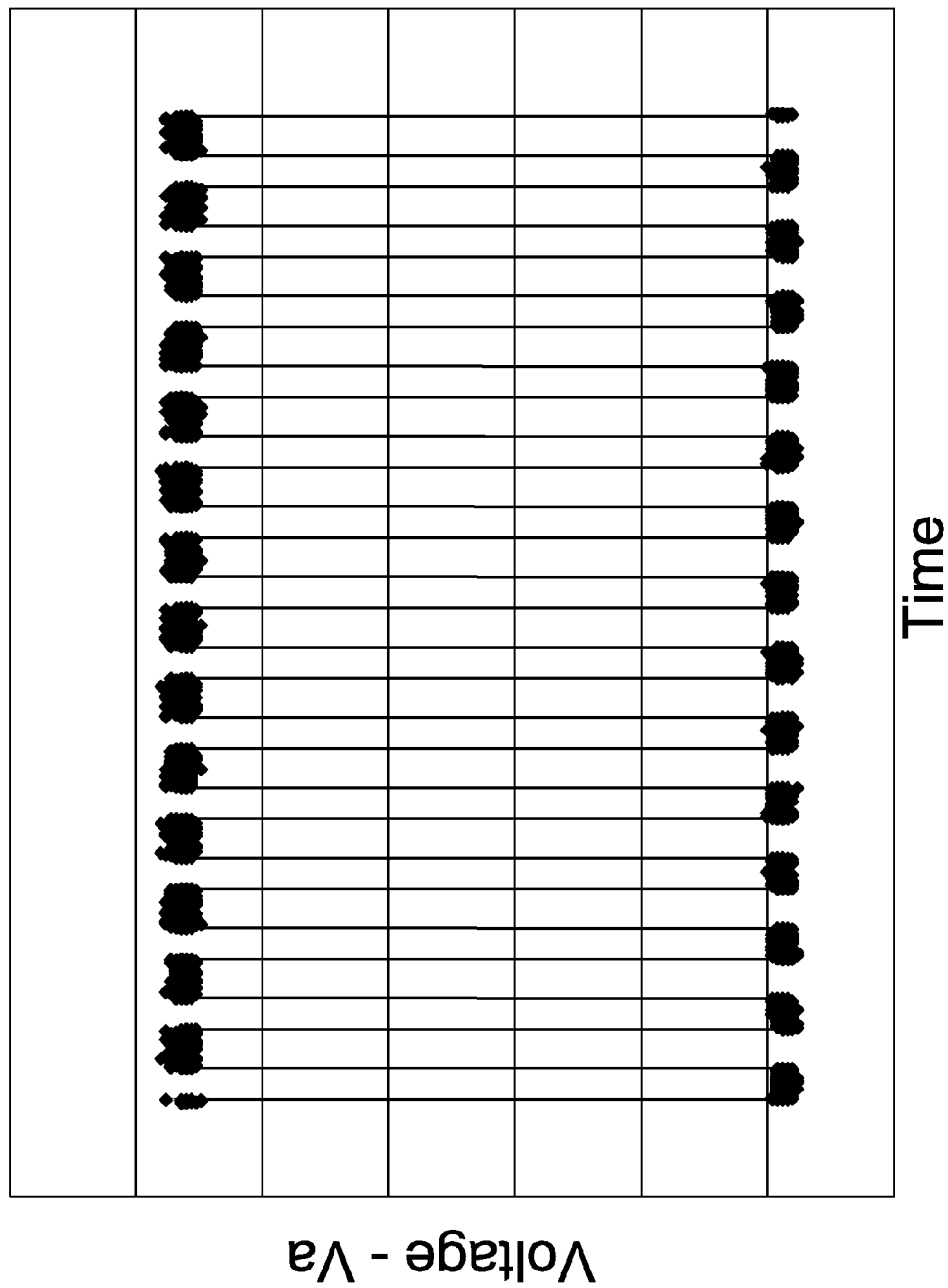
FIGS. 2 and 3 are graphs of the voltage of the clock output signal at the input and termination of a high resistance wire transmission line.
Figure 3:
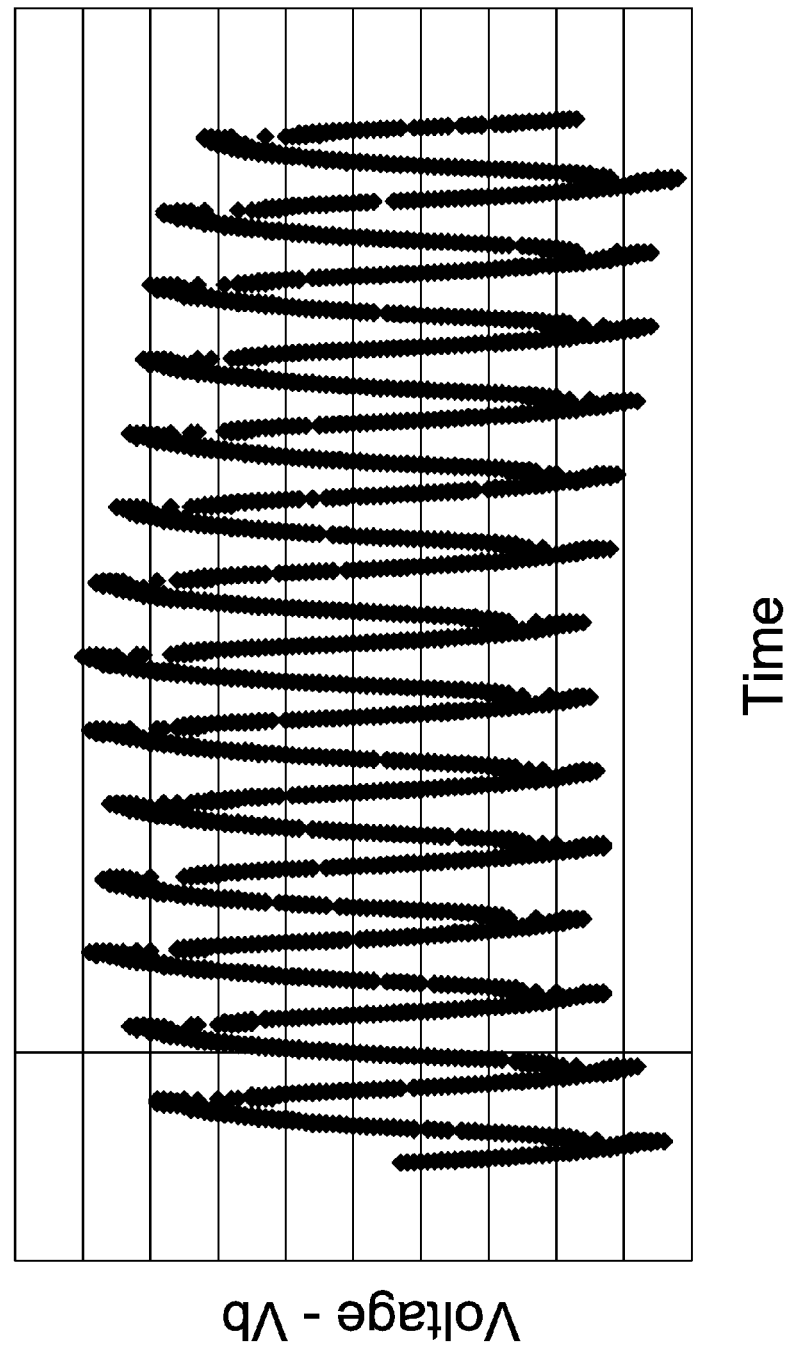

FIGS. 2 and 3 are graphs of the clock output signal voltage at the input and termination of a high resistance wire transmission line composed of a pair of conductors each having a resistance of, for example, 130 KΩ/m, and a long run of, for example, about 10 m. As shown in FIG. 1, the clock output signal is provided on the transmission line 55 at the output of the clock circuit 40, and has a voltage of Va that varies over time. The clock output signal Va, shown in the graph of FIG. 2, has a fundamental frequency corresponding to the capacitance of the fuel probe 30. Exterior to the fuel tank 15, the transmission line 55 terminates at the avionics interface circuit 60. The clock output signal Vb at the termination of transmission line 55 likewise varies over time. However, as shown in the graph of FIG. 3, the clock output signal Vb is a distorted version of the clock output signal Va because of transmission line losses that occur over the length of the transmission line 55. More particularly, the distortion may be caused by attenuation of the higher frequency content of the clock output signal Vb.

Despite this distortion, the fundamental frequency of the clock output signal Va is readily recovered from the clock output signal Vb, since clock output signal Vb still retains the fundamental frequency component of clock output signal Va. The avionics interface circuit 60 may therefore be configured to recover the fundamental frequency component from Vb for determining the level of the fuel 25 and providing this information to the avionics 65.

Figure 4:
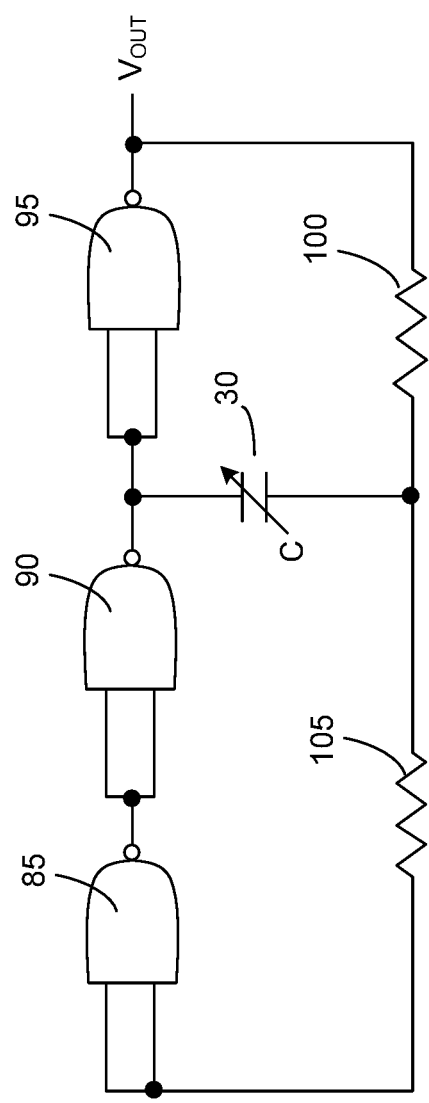
FIG. 4 is a schematic diagram of one example of a clock circuit that may be used in the clock circuit of FIG. 1.

FIG. 4 is a schematic diagram of one example of a clock circuit 80 that may be used in the clock circuit 40 of FIG. 1. The clock circuit 80 uses odd number series of NAND gates 85, 90, and 95. The signal at output $V_{out}$ of NAND gate 95 is fed back to the input of NAND gate 85 through a pair of resistors 100 and 105. The fuel probe 30 is connected as a variable capacitor between the output of NAND gate 90 and the junction between resistors 100 and 105. This configuration results in an oscillator having a pulsed output at $V_{out}$ with a frequency that corresponds to the capacitance of the fuel probe 30. The values of resistors 100 and 105 are used to tune the relationship between the variable capacitance of the fuel probe 30 and the frequency of the clock output signal at $V_{out}$. The clock output signal $V_{out}$ may be buffered before it is provided as the clock output voltage Va on transmission line 55 of FIG. 1.

Figure 5:
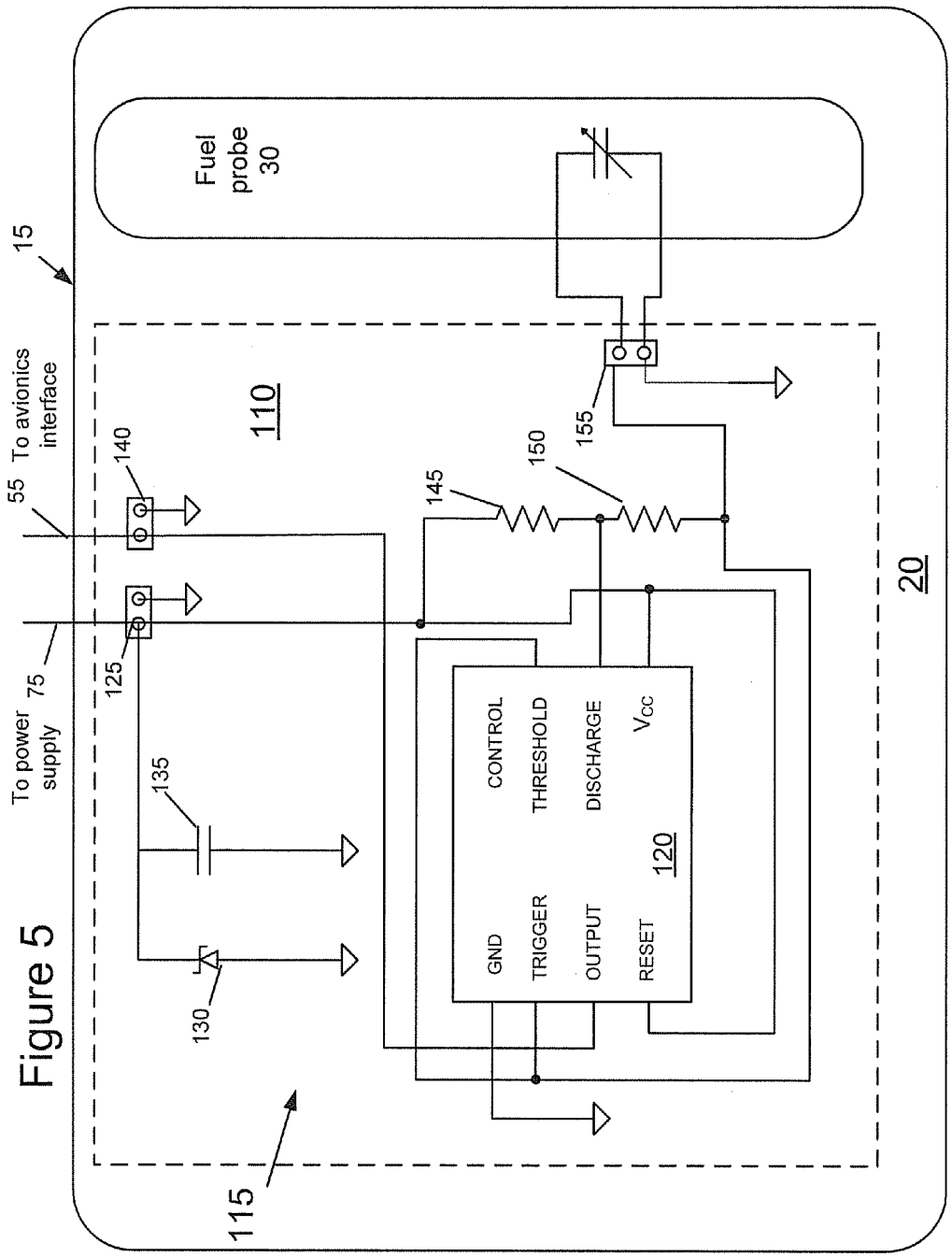
FIG. 5 is a schematic diagram of another example of a clock circuit that may be used in the clock circuit of FIG. 1.

FIG. 5 is a schematic diagram of another example of a clock circuit 110 that may be used in the clock circuit 40 of FIG. 1. In this example, the clock circuit 110 may be implemented on a single printed circuit board 115, which can be mounted directly to the fuel probe 30. Other means of maintaining the clock circuit 110 in close proximity to the fuel probe 30 may be used, as noted above.

The clock circuit 110 is principally based around a clock generator 120. Without limitation, the clock generator 120 may be a 555-style low-power CMOS timer circuit, or another integrated timer or clock circuit. Power for the clock generator 120 is provided from power line 75 to terminal 125 of the printed circuit board 115. Power line 75 may include high resistance wire to facilitate long runs though electromagnetic environments where metallic wiring is not desired. High resistance wire may be used given the low power consumption of the CMOS clock generator 120 used in this example.

A voltage regulator diode 130, such as a Zener diode, and a capacitor 135 are connected in parallel with one another to regulate the voltage received at terminal 125. The regulated voltage is provided to several inputs of the clock generator 120. In FIG. 5, the regulated voltage is provided to the power input $V_{CC}$. Further, it is provided to the RESET terminal to keep the reset signal at an inactive state. However, the RESET terminal may alternatively be connected to a reset timer, or the like, to reset the clock generator 120 if an operational anomaly occurs. The clock circuit 110 may be designed to operate in an astable mode while the reset signal is in an inactive state. For continuous operation, the DISCHARGE terminal and TRIGGER terminal may be connected to one another through resistor 150.

The clock output signal is at the OUTPUT terminal of the clock generator 120 which is in electrical communication with terminal 140 of the printed circuit board 115. The clock output signal at terminal 140 is provided to the avionics interface circuit 60 along transmission line 55. In this example, the transmission line 55 may include high resistance wire.

The signals at the THRESHOLD terminal and the DISCHARGE terminal are the principal signals used to generate the clock output signal at the OUTPUT terminal. In FIG. 5, the THRESHOLD terminal is connected to receive the voltage at the capacitor represented by the fuel probe 30 which is charged using resistors 145 and 150, where resistor 145 is connected to $V_{CC}$. Further, the THRESHOLD terminal and the DISCHARGE terminal are connected with one another through resistor 150. Resistor 150 is connected to a terminal 155 of the printed circuit board 115, which is connected to a first terminal of the variable capacitor of the fuel probe 30. The second terminal of the variable capacitor of fuel probe 30 is received at terminal 155, which is connected to ground. Resistors 145 and 150 operate to tune the clock circuit 110 and variable capacitance of fuel probe 30 so the frequency of the clock output signal remains within a specified range. Here, without limitation, the frequency of the clock output signal is in a range between about 600 Hz and about 2 kHz.

FIG. 6 is an example of one relationship between the fuel level and the frequency of the clock output signal using the clock generator design of FIG. 5. In this example, the frequency of the clock output signal is inversely proportional to the capacitance of the fuel probe 30. Without limitation, exemplary values for the components connected to the CMOS 555 timer IC of FIG. 5 may be:

$R_{145} \approx 340 K\Omega$;
$R_{150} \approx 562 K\Omega$; and
$C_{PROBE} \approx 100$ pF to 1 nF.

A multiplier of 10× may be set within the timer IC so that;

$$F_{clock} = \frac{1.44}{(Multiplier \times (R_{145} + (2 \times R_{150})) \times C_{PROBE})}$$

Again, without limitation, this formula may define the range of the frequency of the clock output signal at the OUTPUT of clock generator 120.

Figure 7:
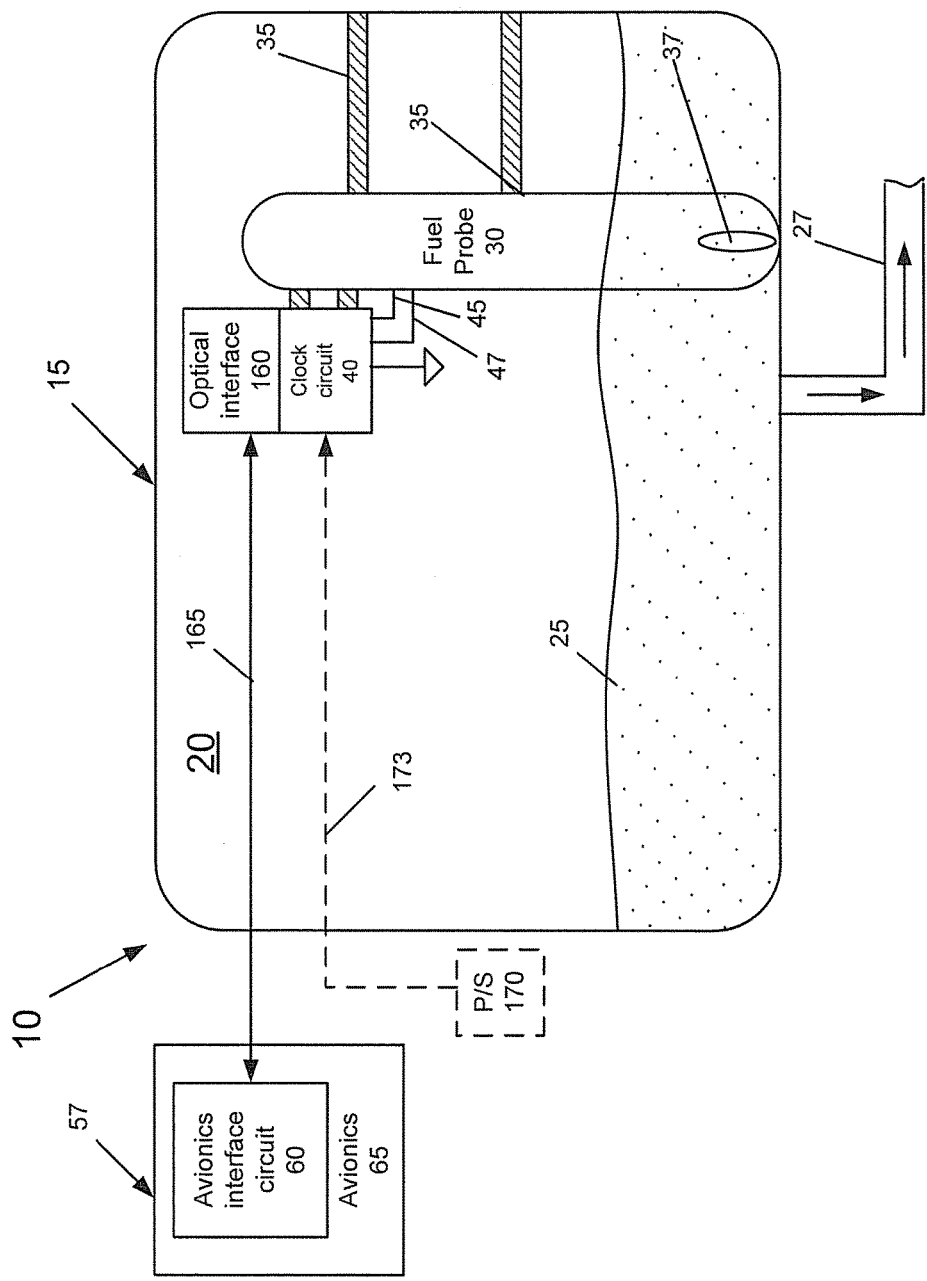
FIG. 7 shows an example of a system, such as an aircraft system, in which a level of fuel in the fuel tank is measured at an in-tank measuring system and sent to an external electrical circuit over an optical path.

FIG. 7 shows another example of a system 10, such as an aircraft system, in which the level of fuel in the fuel tank is measured using an in-tank measuring system. In this example, the in-tank measuring system communicates with an electrical circuit exterior to the fuel tank 15 over an optical path. More particularly, the clock circuit 40 provides the clock output signal to an optical interface 160. The optical interface 160 converts the clock output signal to an optical clock signal having a frequency corresponding to the frequency of the clock output signal of the clock circuit 40. The optical clock signal is transmitted along an optical path 165, such as an optical path having an optical fiber or other means of defining an optical path. The optical clock signal is transmitted along the optical path 165 to the avionics interface circuit 60, where it is converted back to an electrical clock output signal for use by the avionics 65. Energy received along the optical path 165 from the avionics interface circuit 60, or other optical source, may be converted to electrical energy by the optical interface 160 and used to provide power to operate one or both the optical interface 160 and clock circuit 40. Additionally, or in the alternative, a separate power supply 170 may be connected to an analog transmission line 173. When the clock circuit 40 and optical interface 160 are designed for low-power consumption, the analog transmission line 173 may include high resistance wire.

The optical interface 160 may be positioned in close proximity to the clock circuit 40 to reduce the length of the run of electrical wires therebetween. In FIG. 7, the optical interface 160 is mounted directly to the clock circuit 40. Alternatively, the optical interface 160 may be mounted to an interior wall of fuel tank 15 in close proximity to the clock circuit 40. Still further, the optical interface 160 may be mounted to the fuel probe 30 or the support members 35. Any electrical wires extending between the clock circuit 40 and the optical interface 160 may include high resistance wire.

Figure 8:
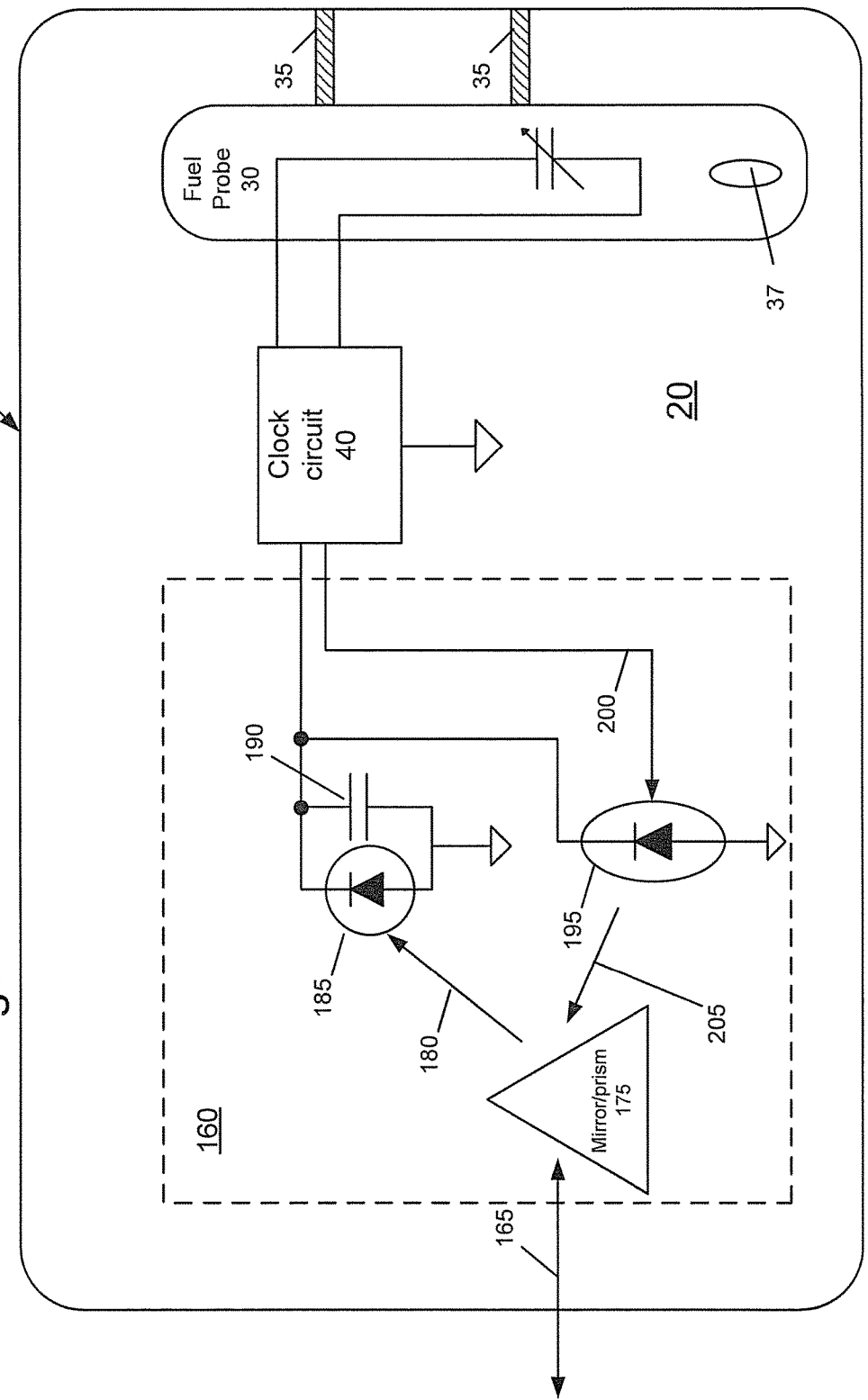
FIG. 8 shows one implementation of the system in FIG. 7, including an example of an optical interface design.

FIG. 8 shows one implementation of the system in FIG. 7, including the optical interface 160. In this example, the optical clock signal from the optical interface 160 is transmitted to the avionics interface circuit 60 in a first direction over optical path 165. Optical energy for powering the optical interface 160 and clock circuit 40 is received in a second direction over optical path 165. The optical clock signals and the optical energy are therefore transmitted in opposite directions.

Given that the both optical clock signal and the optical power are communicated in opposite directions along the same optical path 165, the optical interface 160 separates the signals from one another for separate processing. In the illustrated example, the signals are separated by an optical splitter/combiner configured to transmit and receive signals over the optical path 165. Here, a mirror/prism 175 is used for this purpose.

In one example, power to operate the clock circuit 40 and optical interface 160 is provided over optical path 165. More particularly, the optical energy received over the optical path 165 is directed to the mirror/prism 175. The mirror/prism 175 directs the optical energy to a photodiode 185 along an optical path 180. The optical energy provided to the photodiode 185 may have the same wavelength or a different wavelength than the optical clock signal. The photodiode 185 converts the optical energy received along optical path 180 into electrical energy. The electrical energy is used to power the clock circuit 40. A capacitor 190 may be placed in parallel with the photodiode 185 to reduce power transients. Although not shown, other components, such as a Zener diode, may regulate the output voltage of the photodiode 185.

The electrical power at line 187 also provides power to an optical emitter 195, such as an LED/laser. The light emitted from the optical emitter 195 is modulated by the clock output signal received from the clock circuit 40. The clock output signal at line 200 is an electrical signal, which is converted by optical emitter 195 to an optical clock signal having a frequency corresponding to the frequency of the clock output signal of the clock circuit 40. The optical emitter 195 directs the optical clock signal to the mirror/prism 175 along optical path 205. In turn, the mirror/prism 175 directs the optical clock signal to optical path 165 for transmission to the avionics interface circuit 60.

Figure 9:
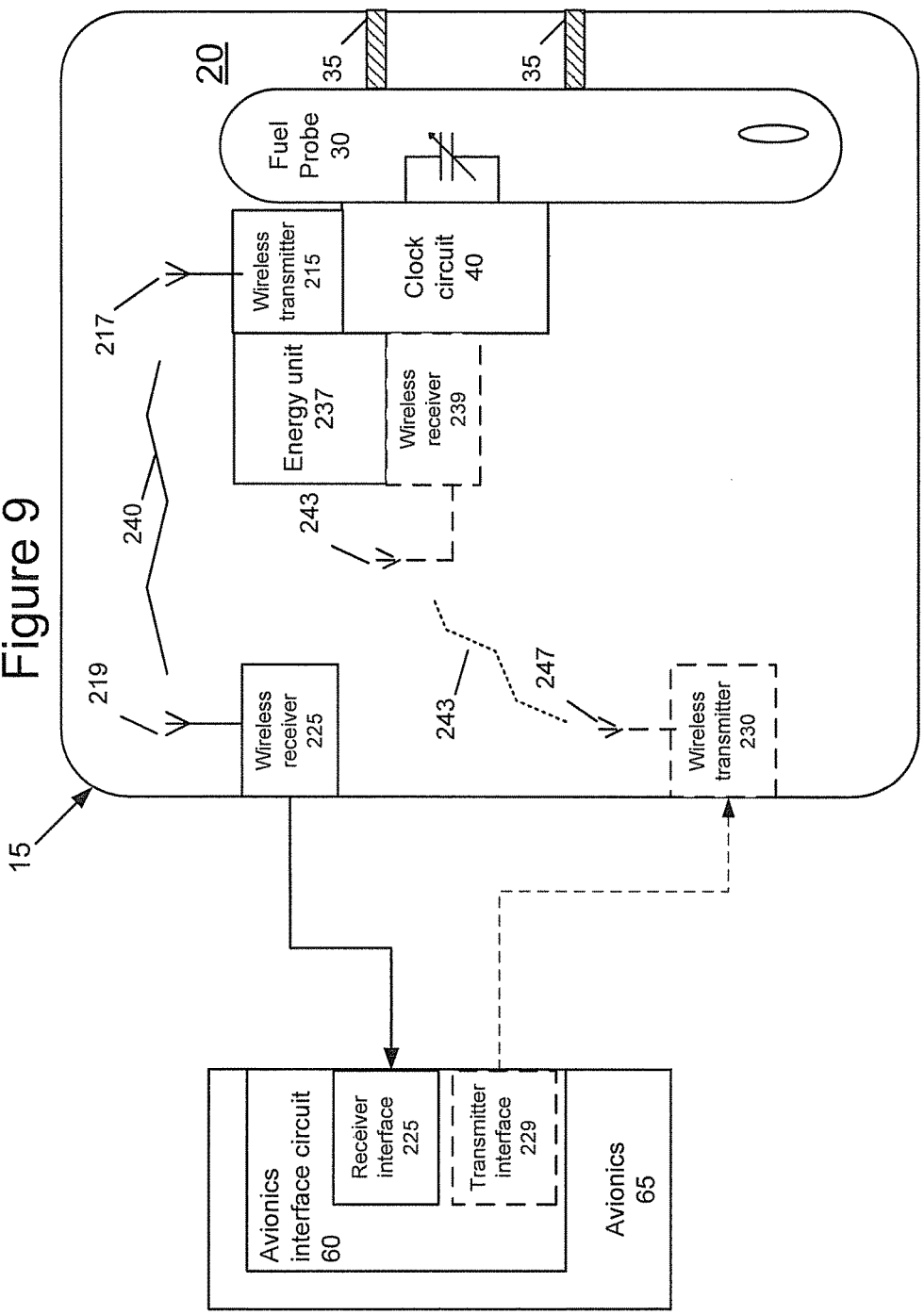
FIG. 9 shows another example of a system in which the level of fuel in a fuel tank is measured at an in-tank measuring system and sent to an electrical circuit exterior to the tank using a wireless system.

FIG. 9 shows another example of system 10 in which the level of fuel in a fuel tank is measured. In this example, the in-tank measuring system uses a wireless transmitter 215 that communicates with a wireless receiver 225 over a wireless path 240. As shown, the wireless transmitter 215 is disposed in close proximity to the clock circuit 40 and fuel probe 30, while the wireless receiver 225 is disposed at an inner boundary of the fuel tank 15. In operation, the clock output signal of clock circuit 40 is provided to the input of the wireless transmitter 215, which uses the clock output signal to modulate a wireless signal. The modulated wireless signal is transmitted by antenna 217 over wireless path 240 to a corresponding antenna 219 of the wireless receiver 225, which is in communication with a receiver interface 229 of the avionics interface circuit 60. The wireless signal includes at least one signal parameter corresponding to the frequency of the clock output signal.

An energy unit 237 is disposed in interior space 20 and provides power to the clock circuit 40 and wireless transmitter 215. The energy unit 237 may generate power in several ways. For example, a wireless transmitter 230 may be disposed at an inner boundary of the fuel tank 15. Power may be provided to the wireless transmitter 230 from a transmitter interface 235 of the avionics interface circuit 60. The received power is transmitted from the wireless transmitter 230 to a corresponding wireless receiver 239 over a wireless path 243 between antennas 247 and 253. The wireless receiver 239 may be disposed in close proximity to the energy unit 237, the wireless transmitter 215, clock circuit 40, and/or fuel probe 30. The wireless receiver 239 is in communication with the energy unit 237, which, in turn, uses that energy to operate the clock circuit 40 and wireless transmitter 215. In another example, the wireless transmitter 230 may be omitted, and the energy unit 237 may be configured to convert vibrational energy into electrical energy to operate the clock circuit 40 and wireless transmitter 215. In a still further example, the energy unit 237 may use both RF energy and vibrational energy to supply power to the clock circuit 40 and wireless transmitter 215.

FIG. 10 shows an aircraft 250 having wing fuel tanks in section 255. Section 255 may comprise stringers and ribs that support the outer skin of the wing.

FIG. 11 is a cutaway view of section 255. In this example, section 255 comprises a plurality of ribs 260 disposed between a front spar 265 and rear spar 270. The ribs 260, front spar 265, and rear spar 270 define a plurality of fuel tank sections 275. Each fuel tank section 275 may have one or more respective in-tank measuring systems 280. Further, each in-tank measuring system 280 may include a respective capacitive fuel probe and clock circuit, where the respective clock circuit is configured for mounting at a position in close proximity to the respective fuel probe. FIGS. 1, 5, and 7-9 represent systems that may be used for the in-tank measuring systems 280.

The clock outputs of the in-tank measuring systems 280 may be provided on respective transmission lines 285 to an avionics interface circuit 60 of, for example, the Fuel Quantity Indicating System 57. The transmission lines 285 may include high resistance wire, optical fibers, optical waveguides, radio frequency waveguides, or a combination of such elements. When the in-tank measuring systems 280 are constructed for wireless operation, the transmission lines 285 may be omitted.

The invention claimed is:

1. An apparatus for measuring a level of fuel in a fuel tank comprising:
   an in-tank measuring system configured for mounting at a predetermined position within the fuel tank, wherein:
      the in-tank measuring system is further configured to generate an oscillating output signal at the predetermined position,
      the oscillating output signal has a frequency that is inversely proportional to the level of the fuel, and
   the in-tank measuring system consists of:
      a capacitive fuel probe configured for mounting within the fuel tank at a position to contact the fuel, wherein the capacitive fuel probe includes a port that allows an amount of fuel to be housed within the capacitive fuel probe that corresponds to a level of fuel stored in the fuel tank and a capacitance that is a function of the level of the fuel housed in the capacitive fuel probe,
      a clock circuit configured for direct mounting to and separate from the capacitive fuel probe, wherein:
         the clock circuit is configured to generate the oscillating output signal, and
         the position of the clock circuit creates a distance between the clock circuit and the capacitive fuel probe within the fuel tank, and
      at least one signal transmission line electrically coupling the capacitive fuel probe and the clock circuit, wherein:
         the distance between the capacitive fuel probe and the clock circuit defines a minimized run for the at least one signal transmission line to reduce resistance and capacitance in the at least one signal transmission line in the fuel tank,
         each signal transmission line comprises a metallic wire including an amount of resistance that is less than a threshold amount of resistance, and
         the threshold amount of resistance is low enough to prevent an amount of damping to the oscillating output signal that is greater than a threshold amount of damping;
   an electrical circuit exterior to the fuel tank; and
   a non-metallic signal transmission line within the fuel tank electrically coupling the clock circuit and the electrical circuit, wherein:
      the non-metallic signal transmission line includes one of a carbon wire and a polymer wire, and
      the non-metallic signal transmission line communicates the oscillating output signal from the clock circuit within the fuel tank to the electrical circuit exterior to the fuel tank.

2. The apparatus of claim 1, wherein the capacitive fuel probe is configured for mounting within a fuel tank of an aircraft.

3. The apparatus of claim 1, wherein the run is minimized by positioning the clock circuit adjacent to the capacitive fuel probe.

4. The apparatus of claim 1, wherein the clock circuit is configured for mounting to a support of the capacitive fuel probe.

5. The apparatus of claim 1, wherein the at least one signal transmission line electrically coupling the capacitive fuel probe and the clock circuit is shorter than the non-metallic signal transmission line.

6. The apparatus of claim 1, wherein an output frequency of the clock circuit includes a range defined by:

$$F_{clock} = \frac{1.44}{(10 \times (R1 + (2 \times R2)) \times C)},$$

wherein,
R1 is a first resistance of a first resistor in the clock circuit,
R2 is a second resistance of a second resistor coupled to the first resistor in the clock circuit, and
C is a capacitance of a fuel probe in the fuel tank coupled to the second resistor.

7. The apparatus of claim 1, wherein the clock circuit comprises:
a voltage regulator coupled to a clock generator comprising a RESET terminal, a DISCHARGE terminal, and a TRIGGER terminal, wherein:
the voltage regulator is configured to regulate an input voltage to the clock generator,
the clock generator is configured to operate in an astable mode in response to the input voltage being supplied to the RESET terminal,
the input voltage is provided to the RESET terminal to place a reset signal of the RESET terminal in an inactive state, and
the DISCHARGE terminal is coupled to the TRIGGER terminal so that the clock circuit continuously generates the oscillating output signal.

8. The apparatus of claim 1, further comprising a power line extending between a location exterior to the fuel tank and the clock circuit, wherein the power line provides power to the clock circuit.

9. The apparatus of claim 8, wherein the power line includes high resistance wire, and wherein the clock circuit includes a low power CMOS timer circuit.

10. The apparatus of claim 1, wherein the clock circuit comprises an odd quantity of NAND gates.

11. The apparatus of claim 10, wherein the clock circuit comprises a first NAND gate, a second NAND gate, and a third NAND gate, wherein the first NAND gate and the second NAND gate are coupled in series.

12. The apparatus of claim 11, wherein the capacitive fuel probe is coupled between the second NAND gate and the third NAND gate and comprises a variable capacitor.

13. The apparatus of claim 12, wherein the clock circuit further comprises a plurality of resistive elements coupled between an output of the third NAND gate and the first NAND gate, wherein the capacitive fuel probe is further coupled between a first resistive element and a second resistive element of the plurality of resistive elements.

14. The apparatus of claim 13, wherein the clock circuit comprises an oscillator that generates a pulsed output signal.

15. An apparatus for measuring a level of fuel in a fuel tank comprising:
an in-tank measuring system configured for mounting at a predetermined position within the fuel tank and determining the level of the fuel in the fuel tank, wherein the in-tank measuring system consists of:
a capacitive fuel probe at a first position for contacting the fuel, the capacitive fuel probe including a port that allows an amount of fuel to be housed within the capacitive fuel probe that corresponds to a level of fuel stored in the fuel tank and a capacitance that is a function of the level of the fuel housed in the capacitive fuel probe at the first position,
a clock circuit configured for direct mounting to and separate from the capacitive fuel probe, wherein:
the clock circuit is configured to generate the clock output signal, and
the position of the clock circuit creates a distance between the clock circuit and the capacitive fuel probe within the fuel tank, and
one or more signal transmission lines electrically coupling the capacitive fuel probe and the clock circuit, wherein:
the distance between the capacitive fuel probe and the clock circuit defines a minimized run for the one or more signal transmission lines to reduce resistance and capacitance in the one or more signal transmission lines in the fuel tank,
each signal transmission line comprises a metallic wire including an amount of resistance that is less than a threshold amount of resistance, and
the threshold amount of resistance is low enough to prevent an amount of damping to the oscillating output signal that is greater than a threshold amount of damping;
an electrical circuit located exterior to the fuel tank; and
a non-metallic signal transmission line, wherein:
the non-metallic signal transmission line includes a carbon wire,
a first portion of the non-metallic signal transmission line is located within the fuel tank,
a second portion of the non-metallic signal transmission line is located exterior to the fuel tank, and
the non-metallic signal transmission line electrically couples the in-tank measuring system and the electrical circuit to provide signal communication between the in-tank measuring system and the electrical circuit.

16. The apparatus of claim 15, wherein the run is minimized by positioning the clock circuit adjacent to the capacitive fuel probe.

17. A system for measuring a level of fuel in a plurality of fuel tank sections of an aircraft, the system comprising:
a plurality of in-tank measuring systems configured for mounting at predetermined positions in the plurality of fuel tank sections, wherein the plurality of in-tank measuring systems are configured to generate respective clock output signals, where the respective clock output signal has a frequency that is inversely proportional to a level of the fuel in the respective section of the plurality of tank sections, wherein each in-tank measuring system of the plurality of in-tank measuring system consists of:
a capacitive fuel probe configured for mounting within the fuel tank at a respective one of predetermined positions to contact the fuel, wherein the capacitive fuel probe includes a port that allows an amount of fuel to be housed within the capacitive fuel probe that corresponds to a level of fuel stored in the fuel tank and a capacitance that is a function of the level of the fuel housed in the capacitive fuel probe at the respective one of the predetermined positions;
a clock circuit configured for direct mounting to and separate from the capacitive fuel probe, wherein:
the clock circuit is configured to generate the clock output signal, and
the position of the clock circuit creates a distance between the clock circuit and the capacitive fuel probe within the fuel tank; and
one or more signal transmission lines electrically coupling the capacitive fuel probe and the clock circuit, wherein:
the distance between the capacitive fuel probe and the clock circuit defines a minimized run for the one or more signal transmission lines to reduce resistance and capacitance in the one or more signal transmission lines in the fuel tank,
each signal transmission line comprises a metallic wire including an amount of resistance that is less than a threshold amount of resistance, and
the threshold amount of resistance is low enough to prevent an amount of damping to the oscillating output signal that is greater than a threshold amount of damping; and
at least one electrical circuit exterior to the plurality of fuel tank sections;
non-metallic signal transmission lines within the fuel tank and each electrically coupling the clock circuit and the electrical circuit over another distance within a respective one of the in-tank measuring systems, wherein:
each non-metallic signal transmission line communicates the clock output signal from the clock circuit within the fuel tank of the respective one of the in-tank measuring systems to the at least one electrical circuit exterior to the fuel tank,
at least one non-metallic signal transmission line includes one of a carbon wire and a polymer wire,
the at least one electrical circuit converts the clock output signals, received from the clock circuits via the non-metallic signal transmission lines, to corresponding signals used by avionics of the aircraft, and
each of the signal transmission lines is shorter than each of the non-metallic signal transmission lines.

18. The system of claim 17, wherein the plurality of fuel tank sections are disposed in at least one wing of the aircraft.

19. The system of claim 17, wherein the one or more electrical circuits exterior to the plurality of fuel tank sections comprise avionics for the aircraft.

20. The system of claim 17, wherein the run is minimized by positioning the clock circuit adjacent to the capacitive fuel probe.

* * * * *